United States Patent
Kelch et al.

[11] Patent Number: 6,042,930
[45] Date of Patent: *Mar. 28, 2000

[54] PLASTIC HEAT-ACTIVATED ADHESIVE LABELS

[75] Inventors: Robert H. Kelch, Midland, Mich.; Harvey C. Tung, Newark, Ohio

[73] Assignee: The Dow Chemical Company, Midland, Mich.

[ * ] Notice: This patent is subject to a terminal disclaimer.

[21] Appl. No.: 08/998,125

[22] Filed: Dec. 24, 1997

[51] Int. Cl.$^7$ .............................. B32B 3/16; B32B 7/12; B41M 31/00; C09J 5/06
[52] U.S. Cl. ...................... 428/195; 156/230; 156/277; 156/305; 156/308.2; 156/311; 156/321; 156/388; 156/DIG. 3; 156/DIG. 9; 156/DIG. 11; 156/DIG. 21; 156/DIG. 36; 156/DIG. 43; 428/335; 428/337; 428/343; 428/355 R
[58] Field of Search ........................... 428/355 R, 195, 428/331, 343, 335; 156/230, 237, 277, 305, 308.2, 311, 321, 388, DIG. 9, DIG. 3, DIG. 11, DIG. 21, DIG. 36, DIG. 43

[56] References Cited

U.S. PATENT DOCUMENTS

| | | |
|---|---|---|
| Re. 32,929 | 5/1989 | Ewing . |
| 3,604,584 | 9/1971 | Shank . |
| 3,657,043 | 4/1972 | Ploetz et al. . |
| 3,663,334 | 5/1972 | Mueller-Tamm et al. . |
| 3,853,693 | 12/1974 | Priddle et al. . |
| 3,857,803 | 12/1974 | Shenfeld et al. . |
| 3,922,435 | 11/1975 | Asnes . |
| 3,952,135 | 4/1976 | Priddle et al. . |
| 4,027,426 | 6/1977 | Wallding et al. . |
| 4,204,029 | 5/1980 | Batchelor et al. . |
| 4,225,049 | 9/1980 | Inoue . |
| 4,314,929 | 2/1982 | Mahoney, Jr. . |
| 4,569,879 | 2/1986 | Groves . |
| 4,608,284 | 8/1986 | Roales . |
| 4,675,351 | 6/1987 | Brown . |
| 4,724,029 | 2/1988 | Koontz . |
| 4,749,739 | 6/1988 | Foster et al. . |
| 4,781,785 | 11/1988 | Szerem et al. . |
| 4,880,683 | 11/1989 | Stow . |
| 4,888,391 | 12/1989 | Domine et al. . |
| 4,941,935 | 7/1990 | Gregory . |
| 4,983,436 | 1/1991 | Bailey et al. . |
| 4,986,866 | 1/1991 | Ohba et al. . |
| 5,075,152 | 12/1991 | Tsukuda et al. . |
| 5,089,341 | 2/1992 | Yoshimura et al. ................... 428/412 |
| 5,091,239 | 2/1992 | Przeworski et al. . |
| 5,126,197 | 6/1992 | Schinkel et al. . |
| 5,242,650 | 9/1993 | Rackovan et al. . |
| 5,252,393 | 10/1993 | Kagota et al. . |
| 5,284,688 | 2/1994 | Hiatt . |
| 5,366,251 | 11/1994 | Brandt et al. . |
| 5,422,189 | 6/1995 | Warner et al. ......................... 428/480 |
| 5,427,842 | 6/1995 | Bland et al. ........................... 428/213 |
| 5,435,963 | 7/1995 | Rackovan et al. . |
| 5,460,878 | 10/1995 | Hostetter . |
| 5,480,700 | 1/1996 | Kume et al. . |
| 5,562,958 | 10/1996 | Walton et al. ......................... 428/34.9 |
| 5,712,031 | 1/1998 | Kelch et al. ........................... 428/355 |

FOREIGN PATENT DOCUMENTS

| | | |
|---|---|---|
| 536673-A2 | 10/1991 | European Pat. Off. . |
| 2607326 | 9/1976 | Germany . |
| 222612 | 5/1985 | Germany . |
| 3910651 | 10/1990 | Germany . |
| 2103-128 | 10/1985 | Japan . |
| 06023890 | 3/1992 | Japan . |
| 06027885 | 3/1992 | Japan . |
| 06238752 | 2/1993 | Japan . |
| 06270250 | 3/1993 | Japan . |
| 1372251 | 10/1974 | United Kingdom . |
| 1418948 | 12/1975 | United Kingdom . |
| 1534001 | 11/1978 | United Kingdom . |
| 2197326 | 5/1988 | United Kingdom . |
| 9424220 | 10/1994 | WIPO . |

*Primary Examiner*—Hoa T. Le

[57] ABSTRACT

A multilayer film useful for making plastic adhesive labels for glass substrates such as glass bottles. The multilayer films contain a base layer, an adhesive layer, and optionally an intermediate layer to improve interlayer bonding between the base layer and the adhesive layer. The adhesive layer comprises a heat-activated thermoplastic adhesive that is not tacky at room temperature. Films of the present invention are sufficiently non blocking at room temperature so as to not require the use of a separate release liner. The film can be utilized in conventional graphics printing operations and made into labels. Labels made from films of the present invention can be thermally adhered to glass substrates and exhibit sufficient adhesion to glass substrates to withstand washing/rinsing, filling, and pasteurization processes utilized in the bottling industry.

9 Claims, No Drawings

PLASTIC HEAT-ACTIVATED ADHESIVE LABELS

This invention relates to plastic adhesive labels for glass substrates and plastic adhesive films suitable for making such labels. Labels of the present invention can be applied to glass bottles prior to the filling of the bottles and can survive rinsing, filling, and pasteurization operations as well as consumer end use applications (e.g. immersion in an ice chest).

Currently, most glass beverage bottles are labeled with paper labels. These paper labels can not withstand the filling and pasteurization processes that the bottles must go through. Thus, to avoid damage to the paper labels, the paper labels are applied to a bottle after the bottle has been rinsed, filled, and pasteurized (i.e., "post-applied"). Generally, printed paper labels are post-applied to filled bottles using aqueous adhesives or hot melt adhesives.

If post-applied paper labels are not completely adhered to the bottle, are misaligned on the bottle, or are otherwise incorrectly applied to the filled bottle, then the entire bottle and contents will be unusable and must be discarded. Thus, it is desired that glass bottles be labeled and inspected prior to being filled and pasteurized to avoid discarding the contents of bottles along with those bottles requiring discard due to defective labels.

It is known in the art to use certain high performance acrylic pressure sensitive adhesives to pre-apply plastic labels to glass bottles following bottle formation at a bottle manufacturing plant. Examples include Optiflex labels (available from Flexcon), Clear Advantage labels (available from Avery), and Primeline label films (available from Polykote Corporation). These labels can generally withstand the bottle washing/rinsing, filling, and pasteurization operations at a bottle filling plant. Thus, these labels have overcome some of the deficiencies of a post-applied label.

However, the high performance acrylic pressure sensitive adhesives are costly and also require the use of a costly silicone release liner. Labels made using high performance acrylic adhesives generally cost 3–5 times as much as paper labels. This increased cost inhibits widespread market acceptance. Additionally, following labeling the silicone release liner must be disposed of, creating a waste issue for the bottle labeler.

SUMMARY OF THE INVENTION

The present invention provides multilayer plastic films that are particularly suited for manufacturing plastic labels for glass substrates. Films of the present invention exhibit a number of properties that make them particularly suitably for manufacture into labels for glass substrates.

Films of the present invention generally comprise a base layer and an adhesive layer bonded to the base layer. The adhesive layer may be bonded directly to the base layer or an intermediate tie layer may be used between the base layer and the adhesive layer to improve interlayer bonding between the base layer and the adhesive layer.

The composition of both the base and adhesive layers are chosen so that the resulting film exhibits the following properties or characteristics. Films of the present invention exhibit sufficient tensile strength, modulus, tear resistance and flatness to allow it to handle well through a graphics printing operation. Films of the present invention also exhibit sufficient adhesion to printing ink such that the ink is not wiped, peeled, or abraded off of the film surface during the printing operation.

Additionally, films and labels of the present invention exhibit excellent adhesion to glass substrates. Films of the present invention contain a heat-activated adhesive layer which will adhere to glass and provide a water and moisture resistant bond to the glass substrate. The adhesive layer is not tacky at room temperature and films of the present invention do not exhibit significant blocking at room temperature. Because films of the present invention are non blocking at room temperature, they do not need to be used in conjunction with a separate release liner or film (e.g., a silicone release liner).

Plastics which can usefully comprise the base layer include polypropylene ("PP"), polyester ("PET"), high density polyethylene ("HDPE"), glycol-modified copolyester ("PETG"), polystyrene ("PS"), polycarbonate ("PC"), and polymethyl methacrylate ("PMMA"). Preferably, the base layer in films and labels of the present invention is made of oriented polypropylene ("OPP") or oriented polyester ("OPET").

It has been found that the following adhesive resins can usefully comprise the adhesive layer: 1) terpolymers of ethylene, about 1 to 30% by weight of an $\alpha$, $\beta$-ethylenically unsaturated carboxylic acid comonomer, and about 1 to 40% by weight of either a vinyl ester or an alkyl ester of an ($\alpha$, $\beta$-ethylenically unsaturated carboxylic acid; 2) terpolymers of ethylene, 1–30% by weight of either a vinyl ester or an alkyl ester of an $\alpha$, $\beta$-ethylenically unsaturated carboxylic acid, and 1–4% maleic anhydride; 3) maleic anhydride-modified ethylene copolymers and terpolymers; and 4) organosilane-modified ethylene copolymers and terpolymers. These resins may be used alone to comprise the adhesive layer or any combination of resins may be blended to comprise the adhesive layer.

In another embodiment of the present invention, multi-layer films of the present invention can be printed on and cut into adhesive labels for adhering to glass containers. Adhesive labels of the present invention can be laminated with pressure to glass bottles which have been pre-heated to greater than about 200° F. Labels of the present invention exhibit dry adhesion peel strengths of at least about 750 grams/inch and wet adhesion peel strengths of at least about 450 grams/inch.

DETAILED DESCRIPTION OF THE INVENTION

Films of the present invention generally comprise a base layer and an adhesive layer bonded to the base layer. The adhesive layer may be bonded directly to the base layer or an intermediate tie layer may be used between the base layer and the adhesive layer to improve interlayer bonding of the adhesive layer to the base layer. Such an intermediate layer can be advantageously coextruded with the adhesive layer. One such useful intermediate layer comprises a copolymer of ethylene and vinyl acetate. The techniques that can be utilized to make films of the present invention are well known in the art.

The composition of both the base and adhesive layers is chosen so that the resulting film meets at least two requirements. First, the film must exhibit sufficient tensile strength, modulus, tear resistance and flatness to allow it to handle well through a graphics printing operation. The physical properties of the composite film are predominately determined by the properties of the base layer. Second, the resulting labels must exhibit sufficient adhesion to glass substrates.

By handling well through a graphics printing operation, it is meant that the film will not wrinkle or fold over upon itself, will not stick or tack to the various rollers in the operation, will not track to the side or move crookedly through the operation, and will not tear or break during the printing operation. Handling well also includes the film exhibiting adequate printing ink adhesion such that the ink is not wiped, peeled or abraded off of the film surface during the printing operation. The graphics printing operations utilized in making labels of the present invention are known in the art and may include, for example, flat screen printing, rotary screen printing, flexographic, and rotographic processes.

Preferably, the base layer in films and labels of the present invention is made of oriented polypropylene ("OPP") or oriented polyester ("OPET"). However, base layers made of high density polyethylene ("HDPE"), glycol-modified copolyester ("PETG"), polystyrene ("PS"), polycarbonate ("PC"), or polymethyl methacrylate ("PMMA") may also be utilized in some embodiments of the present invention. In order to achieve requisite tensile strength and elongation properties, it is generally desired that the films be uniaxially or preferably biaxially oriented. Base layers of OPP and OPET are generally preferred due to their low cost, optical clarity, and high modulus or stiffness. Especially preferred substrates are OPP or OPET films which have been coated with an adhesion enhancing primer or bonding layer, such as a polyvinylidene chloride ("PVDC") coating or acrylic coating which have been liquid coated from a solvent or aqueous dispersion onto the film.

The optical clarity of OPP and OPET films allow them to be used for making clear or "no label look" labels. For making clear labels, the base layer will preferable have a 45° gloss of at least 80% as measured via ASTM D-2457 and a maximum haze of 9%, preferably a maximum haze of 5% as measured via ASTM D-1003. The exposed surface of the base layer (i.e., the surface which is not bonded to the adhesive layer) must be ink receptive to standard aqueous and/or solvent based inks. This requires a film surface energy of at least 40 dynes and preferably at least 45 dynes, as measured by ASTM D-2578. The surface energy of the exposed surface of the base film layer can be increased to required levels, if needed, by pretreatment prior to printing. Pretreatment can include corona treatment, flame treatment, silane coating, acrylic coatings, polyvinylidene chloride ("PVDC") coatings, and the like.

Suitable base layer films will generally have a 1% secant modulus of at least 200,000 psi and preferably at least 250,000 psi as measure via ASTM D-882. Additionally, to minimize water permeation through the film to the adhesive/ glass interface, the base layer should exhibit a water vapor transmission rate ("WVTR") of less than about 3.0 g-mil/ 100 in 2–24 hr and preferably less than about 1.5 g-mil/100 in 2–24 hr as measured via ASTM F-1249. Unless stated otherwise, all WVTR values disclosed in this specification will be measure via ASTM F-1249.

Generally, the base layer is at least about 0.4 mils thick and preferably at least about 0.5 mils thick. The base layer is no thicker than about 3.0 mils and preferably no thicker than about 1.5 mils. Generally, the adhesive layer is at least about 0.3 mils thick and preferably at least about 0.5 mils thick. The adhesive layer is no thicker than about 1.5 mils and preferably no thicker than about 1.0 mils.

Additives may be included in the base layer as long as the amount of additive does not interfere with the film's ability to be printed on and cut into labels and does not interfere with the needed adhesion levels to glass substrates. The amounts and types of additives that can be included in the base layer are generally known in the art or can be determined without undue experimentation. For example, if clear labels are not desired, pigments can be added to the base layer to provide color to the resulting labels.

Preferred embodiments of the present invention are thermally stable enough to resist shrinkage during thermal lamination to a glass substrate. At the desired 250° F. lamination temperature, the composite film should not substantially shrink or contract. Shrinkage of the film, particularly an oriented base layer, during label application will result in leaving a visible adhesive "halo" or adhesive residue around the label, which is aesthetically undesirable.

A shrinkage test was used to characterize the base layer film or entire multilayer composite film. Unless stated otherwise, all shrinkage test results disclosed herein were determined using the following shrinkage test. A 3.0 inch by 3.0 inch square of film is cut and marked in the machine direction ("MD") and transverse direction ("TD") dimensions. A line is drawn in the MD direction from one cut edge to the opposite cut edge and the exact length is measured and recorded. The same measurement in the TD direction is recorded. The film square is supported on a wire mesh screen without any constraints and is then immersed for 30 seconds into a heated silicone oil bath (Dow Corning 200 Silicone fluid) at 200° F. or 250° F. After 30 seconds immersion, the film is removed, dried, and remeasured in the MD & TD directions. Several samples are tested and averaged. The percentage shrinkage in MD and TD dimensions of the original 3.0 inch square is calculated by measuring the length in each dimension after shrinkage and dividing the change in length by the original length (3.0 inches). Preferred embodiments of the present invention exhibit a maximum shrinkage at 250° F. of no more 2.0% and more preferably no more than 1.3% in either the MD or TD direction.

To have sufficient adhesion to glass substrates, labels of the present invention must have sufficient "dry adhesion" and sufficient "wet adhesion." Dry adhesion refers to the level of adhesion to glass observed when applied film or labels are not in the presence of moisture. This occurs before any washing/rinsing, filling, and pasteurization processes. Wet adhesion refers to the level of adhesion to glass observed after applied film or labels have been exposed to moisture. This exposure to moisture occurs during the washing/rinsing, filling, and pasteurization processes as well as during certain consumer end-use applications.

Unless stated otherwise, adhesion levels disclosed in the present application were measured using a peel test method based on ASTM D-903 "Peel or Stripping Strength of Adhesive Bonds" ("adhesion peel test"). In this adhesion peel test, sample films are first adhered to glass bottles. Next, a 1 inch wide strip of film is cut and peeled from around the circumference of the bottle at a rate of 12 inches/minute. The bottle is rotated as the peel test occurs such that the film sample maintains a 180 degree or tangential geometry to the bottle surface. Peel data is recorded in grams/inch.

Dry adhesion levels were measured after labeled bottles had aged or conditioned in an ASTM lab at 50% relative humidity and 23° C. (73° F.) for at least 24 hours. Wet adhesion levels were measured after labeled bottles had been immersed in 23° C. (73° F.) water for 1 hour. The bottles were pulled from the water and immediately the 1 inch wide strips were cut and the adhesion peel test conducted on the wet bottles.

Films and labels of the present invention exhibit dry adhesion values of at least about 750 grams/inch, and preferably at least about 900 grams/inch. Preferably, films and labels of the present invention exhibit wet adhesion levels of at least about 450 grams/inch.

The adhesive layer of the film is not tacky at room temperature. By non-tacky, it is meant that the film does not exhibit stickiness at room temperature (approximately 73° F.), as does a typical pressure sensitive adhesive ("PSA"). Pressure Sensitive Tape Council ("PSTC") test method #6 "Rolling Ball Tack Test" uses an inclined plane to roll a small steel ball onto a strip of adhesive tape or film. The linear distance traveled by the rolling ball upon the exposed adhesive surface prior to being stopped by the adhesive is inversely proportional to the tackiness of the adhesive. The non-tacky adhesive label film of the present invention will not stop (or even significantly slow) the rolling steel ball within the specified 15" length of the adhesive test strip.

Because the adhesive layer is non tacky, films of the present invention are non-blocking. By non-blocking, it is meant that the adhesive film, when wound up onto itself in a roll form (with the adhesive side of the film contacting the printable side), can subsequently be unwound without the separate plies of film adhering or tacking together. Thus, films of the present do not require a separate release liner, such as a silicone coated paper, to permit winding and unwinding of the film.

Films of the present invention can be made into adhesive labels that can be adhered to glass bottles prior to washing/rinsing, filling, and pasteurization processes. Before labels of the present invention are applied to an empty glass bottle, the bottle is pre-heated to a temperature greater than about 200° F. and preferably about 250° F. A pasteurization process typically consists of spraying hot water at a temperature of 150° F.–180° F. onto the glass bottles for about 30–60 minutes.

The adhesive layer must exhibit sufficient thickness, low modulus, and flowability to allow contact clarity with a rough glass surface. Generally, the 2% secant modulus of the adhesive layer composition is below 40,000 psi, preferably below 30,000 psi, and most preferably below 20,000 psi when a 1.0 mil monolayer film of the adhesive is tested according to ASTM D-882. The Vicat Softening Point (ASTM D1525) of the adhesive system will be in the range of 110° F.–180° F. The adhesive will exhibit a Shore A hardness (ASTM D2240) of 20 to 90. Adhesives useful in the present invention have a density of 0.86–0.97 g/cc.

Adhesives useful in the present invention exhibit adequate adhesion to glass at temperatures of about 250° F. (preferred bottle temperature when labels are applied) and yet survive bottle pasteurization of temperatures up to 180° F. If the adhesive were designed or chosen so as to be applied at temperatures significantly lower than 250° F. (e.g., 200° F.), then the adhesive would likely have insufficient thermal resistance to survive hot water pasteurization. If significantly higher temperatures were used to preheat the glass substrate (e.g., 300° F.), the glass would be excessively stressed, potentially cracking the glass. Additionally, pre-heating the glass substrates to higher temperature is less cost effective as higher temperatures consume more energy, require slower manufacturing line speeds, and require more expensive heating equipment.

Accordingly, the adhesive should have a melting point between about 150° F. and about 220° F. (65° C. and 104° C., respectively). The adhesive should have a melt index of at least 2 grams/10 minutes at 190° C., and preferably at least 5 grams/10 minutes as measured via ASTM D-1238, condition E. Additionally, the adhesive should exhibit a 125° C. melt flow rate of at least 0.2 grams/10 minutes and preferably at least 0.5 grams/10 minutes as measured via ASTM D-1238, condition B. Unless stated otherwise, all melt index values disclosed in the specification will have been measured using ASTM D-1238, condition E, and all melt flow rate values will have been measured using ASTM D-1238, condition B.

Adhesives used in the present invention exhibit a water vapor transmission rate of 3.5–20 g-mil/100 in 2–24 hours. Adhesives used in the present invention also absorb water of 0.2 to 0.45 weight percent based on the initial dry film weight after the film has soaked in 72° F. water for 4 days. Unless stated otherwise, all water absorption values disclosed in this specification were measured in this same manner.

When a label is applied to a glass substrate such as a glass bottle, the adhesive must flow and wet-out onto the surface of the heated glass substrate so as to eliminate air bubbles or voids between the label and the surface of the glass. This is particularly important for transparent labels or achieve a "no label look." In transparent labels, any bubbles or voids are more easily visible and become visually or aesthetically unappealing. By "wet out" it is meant that the adhesive will fill any minor voids or surface irregularities and will conform to the surface of the glass substrate. Wet out is a function of the viscosity or melt index of the adhesive and the surface energy, surface tension or polarity of the adhesive with respect to the substrate. Also, embossing a slight texture or matte surface texture onto the adhesive layer can improve air bubble removal, improving wet-out onto the surface of the glass during thermal lamination to a glass substrate (e.g., glass bottle).

It has been found that the following adhesive resins can usefully comprise the adhesive layer: 1) terpolymers of ethylene, about 1 to 30% by weight of an $\alpha$, $\beta$-ethylenically unsaturated carboxylic acid comonomer, and about 1 to 40% by weight of either a vinyl ester or an alkyl ester of an $\alpha$, $\beta$-ethylenically unsaturated carboxylic acid; 2) terpolymers of ethylene, 1–30% by weight of either a vinyl ester or an alkyl ester of an $\alpha$, $\beta$-ethylenically unsaturated carboxylic acid, and 1–4% maleic anhydride; 3) maleic anhydride-modified ethylene copolymers and terpolymers; and 4) organosilane-modified ethylene copolymers and terpolymers. These resins may be used alone to comprise the adhesive layer or any combination of resins may be blended to comprise the adhesive layer. Particularly preferred terpolymers include ethylene-methyl acrylate-acrylic acid (e.g., Exxon Escor ATX resins), ethylene-ethyl or butyl acrylate - maleic anhydride (e.g., Elf Atochem Lotader-MAH resins) and ethylene-vinyl acetate-acrylic acid.

Useful maleic anhydride-modified ethylene copolymers include 1) copolymers of ethylene and about 1 to 30% by weight of an ($\alpha$, $\beta$-ethylenically unsaturated carboxylic acid comonomer and 2) copolymers of ethylene and about 1 to 40% by weight of either a vinyl ester or an alkyl ester of an ($\alpha$, $\beta$-ethylenically unsaturated carboxylic acid. Examples of suitable ($\alpha$, $\beta$-ethylenically unsaturated carboxylic acid comonomers include acrylic acid and methacrylic acid. Examples of suitable ester comonomers include methyl acrylate, ethyl acrylate, methyl methacrylate, ethyl methacrylate, n-butyl acrylate, and vinyl acetate.

Maleic anhydride modification of the ethylene copolymers, achieved by chemically grafting of maleic anhydride onto the ethylene copolymers, has been found to enhance adhesion of the label film to the bottle. For maleic anhydride grafted copolymers, it is desired that at least 0.5% by weight of maleic anhydride be incorporated into the polymer. A preferred maleic anhydride modified polymer is ethylene-vinyl acetate copolymers with at least 15% by weight vinyl acetate comonomer and 0.5–1.5% by weight maleic anhydride, such as DuPont Fusabond adhesives.

Organosilane-modified ethylene copolymers will also exhibit suitable adhesion to glass. Adhesive ethylene copolymers or terpolymers with organosilanes either copolymerized or grafted onto the polymer can be utilized. Ethylene copolymers with 1–10% by weight of a vinyl silane, such as vinyltrimethoxy silane, can be utilized. Especially preferred polymers are terpolymers of ethylene with 5–30% by weight vinyl acetate and 1–8% by weight vinyl silane, such as Aqua-Link EVAVS resins obtained from AT Plastics, or terpolymers of ethylene, with 8–15% by weight alkyl acrylate or alkyl methacrylate, and 1–10% by weight grafted trimethoxysilane, such as are available from DuPont. Additionally, various amino, acrylate, epoxy or vinyl functional trimethoxysilanes can be chemically grafted onto a ethylene copolymer or terpolymer to provide enhanced bonding to a glass surface. This chemistry is well known and is used extensively for silane coupling agents in mineral filled or glass reinforced polymeric composites. Various organosilanes are available from Dow Corning, Union Carbide, HULS, and others. When a silane functionality is used to enhance adhesion to glass, it is desired that the copolymer adhesive not be crosslinked or cured through the silane group.

Ethylene copolymers of ethylene and octene or hexene can be used to blend with maleic anhydride-modified or organosilane-modified copolymers. Especially preferred copolymers are those produced via metallocene catalysis from ethylene and octene, such as the ENGAGE and AFFINITY polyethylenes available from Dow Chemical. These resins, exhibiting specific gravities of 0.86–0.92 g/cc, can be melt blended with other copolymers, such as ethylene-vinyl acetate, or can be graft modified with maleic anhydride or an organosilane to provide excellent adhesion characteristics to a glass bottle.

In order to improve the molten adhesive flow and "wet-out" characteristics during hot lamination of the label to a bottle, tackifiers can be blended into the adhesive composition. Suitable tackifiers include aromatic hydrocarbon resins, aliphatic hydrocarbon resins, mixed aliphatic/aromatic hydrocarbon resins, hydrogenated cyclic resins and rosin esters. These tackifiers typically have ring and ball softening points of about 25° C. to 180° C. The tackifier resin, if used, can be incorporated at levels up to about 50% by weight in a blend with the ethylene copolymers or terpolymers comprising the film adhesive layer. However, the tackifier must not be present in sufficient amount to impart tack to the adhesive layer, which could cause film blocking when wound into a roll.

Additives may also be included in the adhesive layer as long as the amount of additive does not interfere with the film's ability to be printed and cut into labels and does not interfere with the needed adhesion levels to glass substrates. The amounts and types of additives that can be included in the adhesive layer are also generally known in the art or can be determined without undue experimentation. Potentially useful additives include antiblock agents such as SiO2, slip agents such as stearamide or erucylamide, antioxidants, ultraviolet light stabilizers, and tackifiers. Also, if clear labels are not desired, pigments can be added to the adhesive layer to provide color to the resulting labels.

Films of the present invention can be produced by techniques known in the art. For example, the films can be produced via simultaneous coextrusion of the base layer and the adhesive layer, extrusion coating of the adhesive onto a base film, or liquid coating of a solvent or aqueous dispersion of a thermoplastic adhesive onto a base film.

When extrusion or liquid coating techniques are utilized, the base film to be coated can be pretreated. Pretreatment can include corona treatment, flame treatment, silane coating, acrylic coatings, polyvinylidene chloride ("PVDC") coatings, and the like. These pretreatments may improve the wetting out of other coatings such as a coating of printing ink or the coating of adhesive.

EXAMPLES

Unless stated otherwise, percentages in the following examples are based on weight percent.

Example 1

An oriented polyester ("OPET") film was extrusion coated with an adhesive resin to form a two-layer film sample. The OPET film was a 0.75 mil PVDC-coated OPET film (Mylar M34 available from DuPont). The adhesive resin was a terpolymer comprising ethylene, 18% methyl acrylate, and 6% acrylic acid having a melt index of 5 g/10 minutes and a melt flow rate of 0.4 grams/1 0 minutes (Escor ATX-320 available from Exxon) with 0.75% silicon dioxide ("SiO2") added as an antiblock agent via a 5 phr blend of a 15% SiO2 in a low density polyethylene ("LDPE") concentrate. The adhesive also exhibited a water absorption value of 0.33 weight percent. The adhesive was extrusion coated at 425° F. through a conventional slot die onto the PVDC-coated OPET film with the adhesive contacting and adhering to the PVDC coating. The adhesive and OPET film were joined together at a chilled casting roll with a rubber back-up roll forming a nip pressure point on the extrusion coating process. The adhesive coating was 1.0 mils thick, yielding a total film sample thickness of 1.75 mils.

The film exhibited shrinkage of less than 1.5% in the machine direction and less than 0.5% in the transverse direction when tested at 250° F. The film sample exhibited a WVTR of 0.6 g-mil/100 in 2–24 hrs as measured via ASTM F-1249. The film sample was wound up into a roll and in a separate step the exposed polyester side of the film sample was multicolor printed using a conventional multi-station flat screen press and UV curable acrylic-based inks.

The printed film sample was then cut into 3 inch by 3 inch "labels" and thermally laminated to 12 ounce amber long-neck glass bottles which were preheated to 250° F. The labels were applied using pressure with the adhesive layer contacting the heated glass surface.

Adhesion levels were tested using the above-described adhesion peel test. The label samples exhibited a dry adhesion peel strength of 1665 g/inch and a wet adhesion peel strength of 1350 g/inch.

Example 2

A film sample was prepared in the same manner as Example 1. However, 0.8 mil of the Escor ATX-320 adhesive was extrusion coated onto a 0.5 mil OPET film (Melinex 813 available from ICI). Prior to the extrusion coating the OPET film had been subjected to a corona treatment. Also, a matte embossed finish casting roll was used to impart a matte surface roughness to the adhesive layer.

The film sample was tested for adhesion levels in the same manner as the film sample of Example 1. The label samples exhibited a dry adhesion peel strength of 1600 g/inch and a wet adhesion peel strength of 1200 g/inch.

Example 3

A film sample was prepared in the same manner as Example 1. However, 1.0 mil of the Escor ATX-320 adhesive was extrusion coated onto the treated propylene copolymer heatseal layer of a 1.0 mil coextruded, oriented polypropylene film (AA25 available from Amtopp). The 2.0 mil film sample exhibited a WVTR of 0.25 g-mil/100in 2–24 hrs. When tested at 250° F., the film exhibited shrinkage of less than 2.0% in the machine direction and 1.5% in the transverse direction.

The film sample was tested for adhesion levels in the same manner as the film sample of Example 1. The label samples exhibited a dry adhesion peel strength of 1585 g/inch and a wet adhesion peel strength of 1250 g/inch.

Example 4

A film sample was prepared in the same manner as Example 1. The adhesive used was a terpolymer comprising ethylene, 20% methyl acrylate, and 6% acrylic acid having a melt index of 20 g/1 0 minutes and a melt flow rate of 1.6 g/1 0 minutes (Escor ATX-325 available from Exxon). The adhesive also exhibited a water absorptin value of 0.32 weight percent. The adhesive was extruded onto a 0.5 mil PVDC-coated OPET film (Mylar M34 available from DuPont).

The film sample was tested for adhesion levels in the same manner as the film sample of Example 1. The label samples exhibited a dry adhesion peel strength of 1335 g/inch and a wet adhesion peel strength of 1165 g/inch.

Example 5

A film sample was prepared in the same manner as Example 1. The adhesive used was a blend of 80% Escor ATX-325 (available from Exxon) and 20% of a cycloaliphatic hydrocarbon tackifier resin (Escorez 5320 available from Exxon). The adhesive resin was blended with a 15% SiO2 concentrate in LDPE. The total SiO2 content of the adhesive layer was 0.75%. The adhesive was extrusion coated onto the PVDC-coated side of a PVDC-coated OPET film (Mylar M34 available from DuPont).

The film sample was tested for adhesion levels in the same manner as the film sample of Example 1. The label samples exhibited a dry adhesion peel strength of 1335 g/inch and a wet adhesion peel strength of 1165 g/inch.

Example 6

A conventional multilayer cast film line was used to coextrude a two layer film. The first layer was 1.0 mil and comprised a PETG resin (Kodar 6763, available from Eastman) extruded at a temperature of 420° F. The second layer was 1.0 mil and comprised Escor ATX 320 (available from Exxon) with 5 phr of a 15% SiO2 concentrate in LDPE extruded at a temperature of 400° F. The film was cast onto a smooth casting roll cooled to 100 OF prior to winding. The 2.0 mil coextruded film exhibited a WVTR of 2.1 g-mil/100in 2–24 hrs.

The film sample was tested for adhesion levels in the same manner as the film sample of Example 1. The label samples exhibited a dry adhesion peel strength of 1920 g/inch and a wet adhesion peel strength of 1415 g/inch.

Example 7

A two layer coextruded film was produced in the same manner as Example 6 except that a polyethylene blend was used instead of the PETG resin. In the polyethylene blend, 80% high density polyethylene (HDPE 05862N, available from The Dow Chemical Company) having a melt index of 5.0 and a density of 0.962 g/cc was blended with 20% low density polyethylene (LDPE 5351, available from The Dow Chemical Company) having a melt index of 1.9 and a density of 0.925 g/cc. The blend was extruded at a temperature of 420° F. The resulting film exhibited a WVTR of 0.5 g-mil/100in 2–24 hrs.

The film sample was tested for adhesion levels in the same manner as the film sample of Example 1. The label samples exhibited a dry adhesion peel strength of 1460 g/inch and a wet adhesion peel strength of 1375 g/inch.

Example 8

A coextruded 2-layer adhesive was extrusion coated onto oriented polyester ("OPET") film. 92 gauge Mylar 92D OPET was coextrusion coated at 425° F. with a 0.5 mil tie layer of DuPont Elvax 3175 EVA resin (28% vinyl acetate, 6.0 g/10 minute melt index) and a 0.5 mil adjacent exposed layer of Escor ATX-320. The resulting 1.9 mil 3-layer OPET/EVA tie layer/Escor adhesive layer was then adhered to a glass bottle by laminating it at 250° F to the pre-heated bottle, similarily to Example 1. Subsequent peel testing of the film from the glass bottle, after 3 days aging at ambient conditions (73° F., 50% RH), resulted in greater than 1,200 g/inch adhesion.

Example 9

An ethylene-vinyl acetate- vinyl silane ("EVAVS") terpolymer (18% vinyl acetate, 5% vinyl silane, melt index 1.0 g/10 minute) available as AT Plastics Aqua-Link Kl 610 was extrusion coated onto 75 gauge Mylar 75LBT OPET at 425° F. in a manner similar to Example 1. The resulting 2-layer film was thermally laminated to a glass bottle at 250° F.

Example 10

An ethylene-vinyl acetate -grafted- maleic anhydride copolymer (DuPont Fusabond MC190D, 18% vinyl acetate, melt index 15 g/10 minutes, 0.8% maleic anhydride) was extrusion coated at a 1.0 mil thickness onto 0.9 mil ICI Melinex 453 OPET at 400° F. in a manner similar to Example 1. The resulting 1.9 mil film was thermally laminated to a glass bottle at 250° F. Subsequent peel testing of the film from the glass bottle, after 3 days aging at ambient conditions (73° F., 50% RH), resulted in greater than 1,300 g/inch dry adhesion peel strength. Following a 1 hour water immersion, a wet adhesion peel strength of 790 g/inch was recorded.

Example 11

The adhesive film of Example 1 was thermally laminated to a glass bottle as in Example 1. In order to simulate hot water pasteurization of a filled beverage bottle, such as a beer bottle, the labeled bottle was immersed in a pan of water heated to 150° F. for one hour. The bottle was removed from the hot water and adhesion peel testing was immediately performed. The average film peel value was 1420 g/inch.

Example 12

The adhesive film of Example 1 was thermally laminated to a glass bottle as in Example 1. In order to simulate ice chest immersion, such as a filled beverage bottle might be exposed to during consumer consumption, labeled bottles were immersed in a pan of water kept in a refrigerator at 35° F. for varying periods of time. Bottles were periodically removed and immediately tested for film adhesion level. After 24 hours of cold water immersion, the film exhibited 1300 g/inch adhesion; after 48 hours immersion, the film exhibited 1100 g/inch adhesion; and following 72 hours immersion in 35° F. water, the film exhibited 1080 g/inch adhesion.

What is claimed is:

1. A label for a glass bottle, comprising:
   a) a base layer, said base layer having a maximum shrinkage at 250° F. of less than about 2% in the machine direction and less than about 2% in the transverse direction, said base layer having a 1% secant modulus of at least 200,000 psi as measured by ASTM D882, said base layer being graphically printed on via a conventional printing operation; and
   b) an adhesive layer bonded to said base layer, said adhesive layer consisting essentially of an adhesive having a melting point between 150° F. and 220° F. and having a melt index of at least 2 grams/10 minutes at 190° C.; said adhesive layer being sufficiently nontacky at room temperature such that the multilayer film does not exhibit significant blocking at room temperature, and wherein the multilayer film, upon contacting said adhesive layer to a glass substrate heated to greater than about 200° F. and thereafter cooling, exhibits a dry adhesion peel strength of at least about 750 grams/inch and a wet adhesion peel strength of at least about 450 grams/inch.

2. A label according to claim 1, wherein said base layer has a water vapor transmission rate of less than about 3.0 g-mil/100 in$^2$-24 hr as measured by ASTM F-1249.

3. A label according to claim 1, wherein said base layer has a water vapor transmission rate of less than about 1.5 g-mil/100 in$^2$-24hr as measured by ASTM F-1249.

4. A label according to claim 1, wherein said adhesive layer consists essentially of an adhesive having a 125° C. melt flow rate of at least 0.2 grams/10 minutes.

5. A label according to claim 1, wherein said base layer has a 450° gloss of at least 80%.

6. A label according to claim 1, wherein said base layer has a maximum haze of 9%.

7. A label according to claim 1, wherein the thickness of said base layer is between about 0.4 mils and 3.0 mils.

8. A label according to claim 1, wherein the thickness of said adhesive layer is between about 0.3 mils and 1.5 mils.

9. A process for labeling a glass bottle, comprising the steps of:
   i) providing a multilayer film, comprising:
      a) a base layer, said base layer having a maximum shrinkage at 250° F. of less than about 2% in the machine direction and less than about 2% in the transverse direction, said base layer having a 1% secant modulus of at least 200,000 psi as measured by ASTM D882, said base layer being graphically printed on via a conventional printing operation; and
      b) an adhesive layer bonded to said base layer, said adhesive layer consisting essentially of an adhesive having a melting point between 150° F. and 220° F. and having a melt index of at least 2 grams/10 minutes at 190° C.; said adhesive layer being sufficiently nontacky at room temperature such that the multilayer film does not exhibit significant blocking at room temperature;
   ii) printing on the base layer using a conventional graphics printing operation; and
   iii) contacting the adhesive layer of the multilayer film to a glass bottle heated to greater than about 200° F.,
wherein the label, after cooling, adheres to the bottle with a dry adhesion peel strength of at least about 750 grams/inch and a wet adhesion peel strength of at least about 450 grams/inch.

* * * * *

UNITED STATES PATENT AND TRADEMARK OFFICE
CERTIFICATE OF CORRECTION

PATENT NO : 6,042,930

DATED : March 28, 2000

INVENTOR(S) : Robert H. Kelch; Harvey C. Tung

It is certified that error appears in the above-identified patent and that said Letters Patent are hereby corrected as shown below:

Column 2, line 24, delete "(" before "α, β-etheylenically".

Column 6, line 53, delete "(" before "α, β-etheylenically".

Column 6, line 57, delete "(" before "α, β-etheylenically".

Column 6, line 58, delete "(" before "α, β-etheylenically".

Column 12, line 2, replace "has a 450° gloss... with "has a "45° gloss...".

Signed and Sealed this

Fifteenth Day of May, 2001

Attest:

NICHOLAS P. GODICI

Attesting Officer

Acting Director of the United States Patent and Trademark Office